United States Patent
Lin

(10) Patent No.: US 10,974,185 B2
(45) Date of Patent: Apr. 13, 2021

(54) SIDE-COVERED AXIAL FLOW FILTER

(71) Applicant: Pro-Pure Inc., New Taipei (TW)

(72) Inventor: Hsiang-Chi Lin, New Taipei (TW)

(73) Assignee: Pro-Pure Inc., New Taipei (TW)

( * ) Notice: Subject to any disclaimer, the term of this patent is extended or adjusted under 35 U.S.C. 154(b) by 334 days.

(21) Appl. No.: 15/941,385

(22) Filed: Mar. 30, 2018

(65) Prior Publication Data

US 2019/0224605 A1 Jul. 25, 2019

(30) Foreign Application Priority Data

Jan. 25, 2018 (TW) .................................. 107102695

(51) Int. Cl.
*B01D 46/00* (2006.01)
*B01D 46/10* (2006.01)
(Continued)

(52) U.S. Cl.
CPC .............. *B01D 46/10* (2013.01); *B01D 45/16* (2013.01); *B01D 46/0005* (2013.01);
(Continued)

(58) Field of Classification Search
CPC ............ B01D 46/0006; B01D 46/4227; B01D 46/2414; B01D 45/16; B01D 46/10;
(Continued)

(56) References Cited

U.S. PATENT DOCUMENTS 5,605,554 A 2/1997 Kennedy
5,863,313 A 1/1999 Coulonvaux
(Continued)

FOREIGN PATENT DOCUMENTS

CN 101816872 A 9/2010
CN 102015057 A 4/2011
(Continued)

OTHER PUBLICATIONS

European Patent Office, Extended European Search Report for related Application No. 18166071.3, dated Oct. 24, 2018, 8 pages.
(Continued)

*Primary Examiner* — Jonathan Luke Pilcher
(74) *Attorney, Agent, or Firm* — Thomas J. Nikolai; DeWitt LLP

(57) ABSTRACT

A side-covered axial flow filter has a housing, a filter core, a filter frame, and a side cover. When assembling, the filter frame and the filter core are both obliquely installed into the housing. Limiting ribs of the filter frame are obliquely mounted between first pushing panels and a clamping surface of the housing, and inner pushing parts of the limiting ribs abut the first pushing panels. The portions of the inner pushing parts abutting the first pushing panels serve as fulcrums to straighten the filter core and the filter frame, so outer pushing parts of the limiting ribs may abut the clamping surfaces of the housing and generate a strong torque and a tightly sealing effect without much effort. The side cover also abuts the filter frame when assembled on the housing, so the filter frame is under balanced pressure to avoid leak.

10 Claims, 11 Drawing Sheets

(51) Int. Cl.
*B01D 45/16* (2006.01)
*B01D 46/24* (2006.01)
*B01D 50/00* (2006.01)
*B01D 46/52* (2006.01)

(52) U.S. Cl.
CPC ..... *B01D 46/0006* (2013.01); *B01D 46/2418* (2013.01); *B01D 46/2422* (2013.01); *B01D 46/521* (2013.01); *B01D 50/002* (2013.01); *B01D 2265/025* (2013.01); *B01D 2271/027* (2013.01); *B01D 2279/30* (2013.01)

(58) Field of Classification Search
CPC ............ B01D 46/2418; B01D 46/2422; B01D 50/002; B01D 46/0005; B01D 2265/025; B01D 2279/30; B01D 2271/027
See application file for complete search history.

(56) References Cited

U.S. PATENT DOCUMENTS

| | | | |
|---|---|---|---|
| 6,179,890 B1 | 1/2001 | Ramos et al. | |
| 7,905,936 B2 | 3/2011 | Coulonvaux et al. | |
| 8,657,900 B2* | 2/2014 | Menssen | B01D 46/0013 55/337 |
| 8,926,724 B2* | 1/2015 | Menssen | B01D 46/0013 55/481 |
| 9,108,132 B2* | 8/2015 | Menssen | F02M 35/0203 |
| 2004/0003580 A1 | 1/2004 | Avery | |
| 2008/0066434 A1 | 3/2008 | Kuempel et al. | |
| 2011/0099960 A1* | 5/2011 | Menssen | B01D 46/0005 55/480 |
| 2012/0198802 A1* | 8/2012 | Menssen | B01D 46/0004 55/337 |
| 2013/0152526 A1* | 6/2013 | Menssen | B01D 46/521 55/480 |
| 2014/0033666 A1* | 2/2014 | Menssen | B01D 46/2422 55/495 |
| 2014/0250843 A1 | 9/2014 | Krull et al. | |
| 2015/0107200 A1* | 4/2015 | Menssen | B01D 46/0023 55/482 |
| 2017/0252688 A1 | 9/2017 | Wuebbeling | |

FOREIGN PATENT DOCUMENTS

| | | |
|---|---|---|
| CN | 102258918 A | 11/2011 |
| CN | 102574041 B | 1/2015 |
| CN | 205235594 U | 5/2016 |
| CN | 106039852 A | 10/2016 |
| CN | 107008067 A | 8/2017 |
| CN | 107223069 A | 9/2017 |
| DE | 102014008701 B4 | 12/2015 |
| JP | 2005524797 A | 8/2005 |
| JP | 2007510858 A | 4/2007 |
| JP | 2007535641 A | 12/2007 |
| JP | 2013507248 A | 3/2013 |
| JP | 2013507569 A | 3/2013 |
| KR | 101491226 | 6/2012 |
| TW | 333060 | 6/1998 |
| TW | M257820 | 3/2005 |
| TW | M490509 U | 11/2014 |
| TW | M545226 U | 7/2017 |
| TW | M549864 U | 10/2017 |
| WO | 2008080129 | 7/2008 |
| WO | 2017192441 A1 | 11/2017 |

OTHER PUBLICATIONS

Taiwan Intellectual Property Office for related Application No. 10720801910, dated Aug. 31, 2018, 4 pages.

* cited by examiner

SIDE-COVERED AXIAL FLOW FILTER

CROSS-REFERENCE TO RELATED APPLICATIONS

This application is based upon and claims priority under 35 U.S.C. 119 from Taiwan Patent Application No. 107102695 filed on Jan. 25, 2018, which is hereby specifically incorporated herein by this reference thereto.

BACKGROUND OF THE INVENTION

1. Field of the Invention

The present invention relates to a filter for filtering suspended particles from fluid, especially to a side-covered axial flow filter.

2. Description of the Prior Arts

Axial flow filters are capable of filtering suspended particles from fluids, especially separating the aerosol droplets or tiny particles from the air. Normally axial flow filters are mounted in places with a large amount of particle exhaust or high-standard demand for air quality, such as the car exhaust system.

Generally, the conventional filter has a cover which is configured to be opened on one end of the filter, so the users can replace the used filter core with a new one. However, compared with the general-purpose filter, the conventional automotive axial flow filter mounted in the car exhaust system has a side cover configured to be opened laterally in order to be fitted in the limited inner spaces of the cars. Therefore, the side-opening cover is more convenient and suitable for replacing the filter core in a narrow space such as the car exhaust system.

Conventional automotive axial flow filters as disclosed in China patent application No. CN102574041B comprises a filter, a housing and a side cover. An installation opening is formed through the housing, and the filter may be mounted into the housing through the installation opening. The side cover is capable of mounting the filter securely inside the housing.

Specifically, the filter comprises a filter core, a filter frame and a sealing unit. The filter frame is mounted around an axial end of the filter core, and two contact surfaces are formed on two sides of the filter frame respectively. The sealing unit is formed on an axial end of the filter frame and is axially clamped between the filter frame and an inner surface of the housing in order to achieve an axial sealing effect.

After the filter has been disposed inside the housing, insert the side cover into the housing through the installation opening. Two clamping brackets protrude from two opposite sides of the side cover and extend toward the housing. Each one of the two clamping brackets is an elongated panel. Each clamping bracket has a respective clamping surface formed on one side thereof. When the side cover is being gradually mounted to the housing through the installation opening, the two clamping surfaces of the two clamping brackets will then gradually and axially push the filter frame toward the scaling unit along the contours of the two contact surfaces of the filter frame. Therefore the sealing unit will be gradually compressed. By the aforementioned means, when the side cover has been completely inserted in the housing and also has closed the installation opening, the side cover will then push the sealing unit tightly to seal the filter axially.

However, the aforementioned China patent has several defects.

First, the sealing effect of the filter completely depends on the pushing force from the side cover, but the direction in which the side cover is inserted into the housing is perpendicular to the direction in which the side cover pushes the filter frame. Therefore the user's pushing force exerted on the side cover cannot be completely transmitted to the filter frame, which means the user needs to exert more force to the side cover than the side cover really needs to push the filter frame. Therefore the assembling and dissembling processes are both laborious.

Second, the side cover pushes the filter frame in an axial direction of the filter, but exerting a force along the axial direction of the filter is inherently more laborious than exerting a force along a radial direction of the filter. Therefore, this structural characteristic makes the assembling and dissembling processes even more laborious.

Third, another problem about axial sealing is that the material used in the sealing unit, which has a relatively high friction coefficient, normally includes rubber or other similar materials. As the sealing unit is mounted on the filter, during the process of disposing the filter into the housing, the sealing unit is constantly rubbing against the inner surface of the housing, which makes the disposition of the filter more difficult.

Fourth, because the axial pushing force from the side cover to the filter frame comes through the two clamping brackets, the length of each one of the clamping brackets has to be long enough to reach the other side of the housing corresponding to the side cover, so the pushing force from the side cover may transmit the pushing force to the filter frame completely along the radial direction of the housing. However, the length requirement for the clamping brackets makes the clamping brackets difficult to manufacture, which also raises the cost. Besides, the length of the elongated panel structure of the clamping brackets may also weaken the structural strength of the clamping brackets, making the clamping bracket prone to fracture when subjected to external forces.

Fifth, as mentioned in the first point, the direction of the force from the clamping brackets to the filter frame is perpendicular to the disposing direction of the clamping brackets, and this may also cause uneven pressures on the clamping brackets. Specifically, a portion of each one of the clamping brackets which is adjacent to the side cover may endure the largest amount of pressure, and a portion of each one of the clamping brackets which is far away from the side cover may endure the least amount of pressure. The uneven amounts of pressure on the clamping brackets may cause the clamping brackets to push the filter frame unevenly. Even if the clamping brackets are lengthened in order to ameliorate the uneven pressure, the pushing force from the portion of the clamping brackets that is far away from the side cover is still smaller than the pushing force from the portion of the clamping brackets that is adjacent to the side cover. The uneven pressure is detrimental to the sealing effect of the sealing unit because the uneven sealing pressure on the sealing unit may cause leaking of the fluids while passing through the housing.

Another conventional automotive axial flow filter is provided in U.S. Pat. No. 7,905,936B2 "FILTER ARRANGEMENT; HOUSING; ASSEMBLIES; AND, METHOD". The said conventional automotive axial flow filter has a filter being pushed jointly by a side cover and an inner surface of a housing, which is different from the aforementioned China patent. Meanwhile, the filter is pushed from a rear end.

Specifically, the inner surface of the housing has an inclined recess. The filter comprises a filter core and two filter frames. The two filter frames are mounted on a front end and a rear end respectively, and the front end and the rear end are two opposite ends of the filter core along an axial direction of the filter core. When the filter is disposed into the housing, a rear end of the filter is placed obliquely so the filter frame at the rear end of the filter core may be disposed in the inclined recess. Then straighten the filter so the scaling unit mounted on a front end of the filter may radially abut the inner surface of the housing. Then mount the side cover on the housing, and the side cover will then abut the filter frame from the rear end of the filter and push the said filter frame forwardly, so the filter may remain straight and sealed radially and tightly by the sealing unit.

However, the US patent also has several defects.

First, the filter is pushed forwardly from the rear end thereof to compress the sealing unit on the inner surface of the housing by the front end of the filter, and both ends (front and rear) of the filter core need a filter frame to increase the contact area so the pressure caused by the force from the side cover may be dispersed. By doing so, the filter core may avoid deformation and damage caused by the pushing force that is over concentrated on specific parts of the filter core. But mounting two filter frames on the filter core may raise the cost dramatically.

Second, the filter core is pushed forwardly from the rear end thereof, which means the front end and the rear end of the filter core abut either the inner surface of the housing or the side cover or both. Therefore the dimensional tolerance of the front-end length (axial length) of the filter core cannot be too large. Specifically, if the length of the filter core along the axial direction is too short, the front end and the rear end may not tightly abut the housing or the side cover. On the other hand, if the length of the filter core along the axial direction is too long, it may makes the side cover difficult to mount on the housing.

Third, as mentioned in the second point, the filter (especially the filter core) is pushed forwardly from the rear end thereof, and then the front end of the filter (precisely, the filter frame on the front end of the filter) will push the sealing unit forwardly, which makes the sealing units compressed between the inner surface of the housing and the filter. In other words, the extension line of the pushing force is extended through the filter core, which means the filter core is constantly being compressed by the pushing force. However, after use for a while, the filter core may gradually soften due to the material of which the filter core is made (normally paper or other similar soft materials), which is even made worse by dampness. The softened filter core may not sustain the pushing force and thus may be deformed by the pushing force. The deformed filter core will then lose the clamping effect on the scaling unit and reduce the sealing effect.

In summary, the two aforementioned patents have their own defects that need to be improved.

To overcome the shortcomings, the present invention provides a side-covered axial flow filter to mitigate or obviate the aforementioned problems.

SUMMARY OF THE INVENTION

The main objective of the present invention is to provide a side-covered axial flow filter that only needs one filter frame. Also, the pushing force is generated jointly by the housing and the side cover of the filter. The housing and the side cover push the filter frame from two opposite sides of the filter frame respectively. Therefore the filter is easy to be assembled and cost thereof can be reduced.

The side-covered axial flow filter has a housing, a filter core, a filter frame, a sealing unit and a side cover. The housing has an axial direction and a radial direction, and the axial direction and the radial direction are perpendicular to each other. An inlet and an outlet are formed respectively on two opposite ends of the housing along the axial direction. An installation opening is formed on a side surface of the housing along the radial direction and communicates with the inlet and the outlet. A clamping surface is defined as an inner surface of the housing and the outlet is formed through the clamping surface. Two first protruding panels protrude from the inner surface of the housing, are opposite each other, and are adjacent to the outlet. The two first protruding panels and the installation opening are respectively disposed on two opposite sides of the housing along the radial direction. The filter core is mounted in the housing. The filter frame is mounted on an end of the filter core along the axial direction. When the filter core and the filter frame are mounted in the housing, the filter frame is adjacent to the outlet of the housing. The filter frame has two limiting ribs. The two limiting ribs protrude from the filter frame and are opposite to each other. Each limiting rib protrudes through a portion of the housing between a respective one of the two first pushing panels and the clamping surface. Each limiting rib has an outer part and an inner part. The outer part protrudes toward the outlet of the housing and abuts the clamping surface. The inner part protrudes toward the inlet of the housing and abuts the corresponding first pushing panel. A portion of the inner part abutting said respective first pushing panel is radially outward with respect to a portion of the outer part abutting the clamping surface. The sealing unit is mounted on the filter frame and clamped between the filter frame and the housing. The side cover is detachably mounted on the housing, covers the installation opening, and pushes the filter frame toward the outlet of the housing. After the side cover is mounted in the installation opening of the housing, the side cover pushes the filter frame toward the outlet of the housing, such that the first pushing panels of the housing respectively push the inner pushing parts of the filter frame toward the outlet, and the outer pushing parts of the filter frame push the clamping surface of the housing toward the outlet.

Given the foregoing structure of the side-covered axial flow filter, the assembling process has several steps as follows. First, mount the filter frame on the filter core, and put the filter frame and filter core together into the housing obliquely through the installation opening. After disposing the filter frame and the filter core in the housing, the limiting ribs will be obliquely mounted between the corresponding first pushing panel of the housing and the clamping surface of the housing, and therefore the inner pushing part of each one of the limiting ribs will then abut against the corresponding first pushing panel. The portion of the inner pushing part abutting the first pushing panel servers as a fulcrum, facilitating the user to straighten the filter core and the filter frame toward the outlet, so the outer pushing part, which is on the other side of the said limiting rib with respect to the inner part, may tightly abut the clamping surface of the housing. Lastly, mount the side cover on the housing. The side cover may constantly push the filter frame toward the outlet so the filter frame may remain straight.

By taking the portion of the inner pushing part abutting the first pushing panel as the fulcrum to push the filter core and the filter frame, and by abutting the outer pushing parts against the clamping surface of the housing, the pushing forces from an inner side of the filter frame and the pushing forces from an outer side of the filter frame that are transmitted to the filter frame are in a staggered manner along the radial direction of the filter frame. Therefore, the present invention provides a firm and strong torque by the aforementioned means (similar to the seesaw principle). On the other hand, the strong torque does not require a huge amount of force from the user, so the present invention is labor-saving but still firmly and tightly pushes the filter frame. Specifically, the labor-saving mechanism of the side cover makes it easier to assemble the side cover with the housing and disassemble the side cover from the housing. And, the filter frame is pushed in balance by the first pushing panels and the side cover from two opposite sides of the filter frame, so the sealing pressure of the sealing unit is disposed evenly, which prevents the fluids that pass through the housing from leaking out from the cracks between the sealing unit and the inner surface of the housing. Meanwhile, all the elements in the present invention are under even force and the length of each element is of a reasonable value, so the present invention may prevent the filter frame, the housing or the side cover from cracking due to the unevenly disposed and over-concentrated pushing force.

Lastly, the present invention only needs one single filter frame and does not need a protruding and elongated structure similar to the clamping brackets in the aforementioned China patent, so the production cost is lower than the clamping brackets in the China patent. Besides, the production cost of the present invention is also lower compared to the aforementioned US patent, which has two filter frames. And, because a rear end of the filter core in the present invention is not in contact with any other objects, the axial tolerance of the filter core can be neglected, and the housing may be suitable for filter cores of different lengths. Finally, since the filter frame is directly pushed by the housing and the side cover, the sealing unit is also directly pushed by the filter frame as a result. Therefore, the pushing force against the sealing unit will not pass through the filter core, which prevents the filter core from deformation or damage caused by the pushing force.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
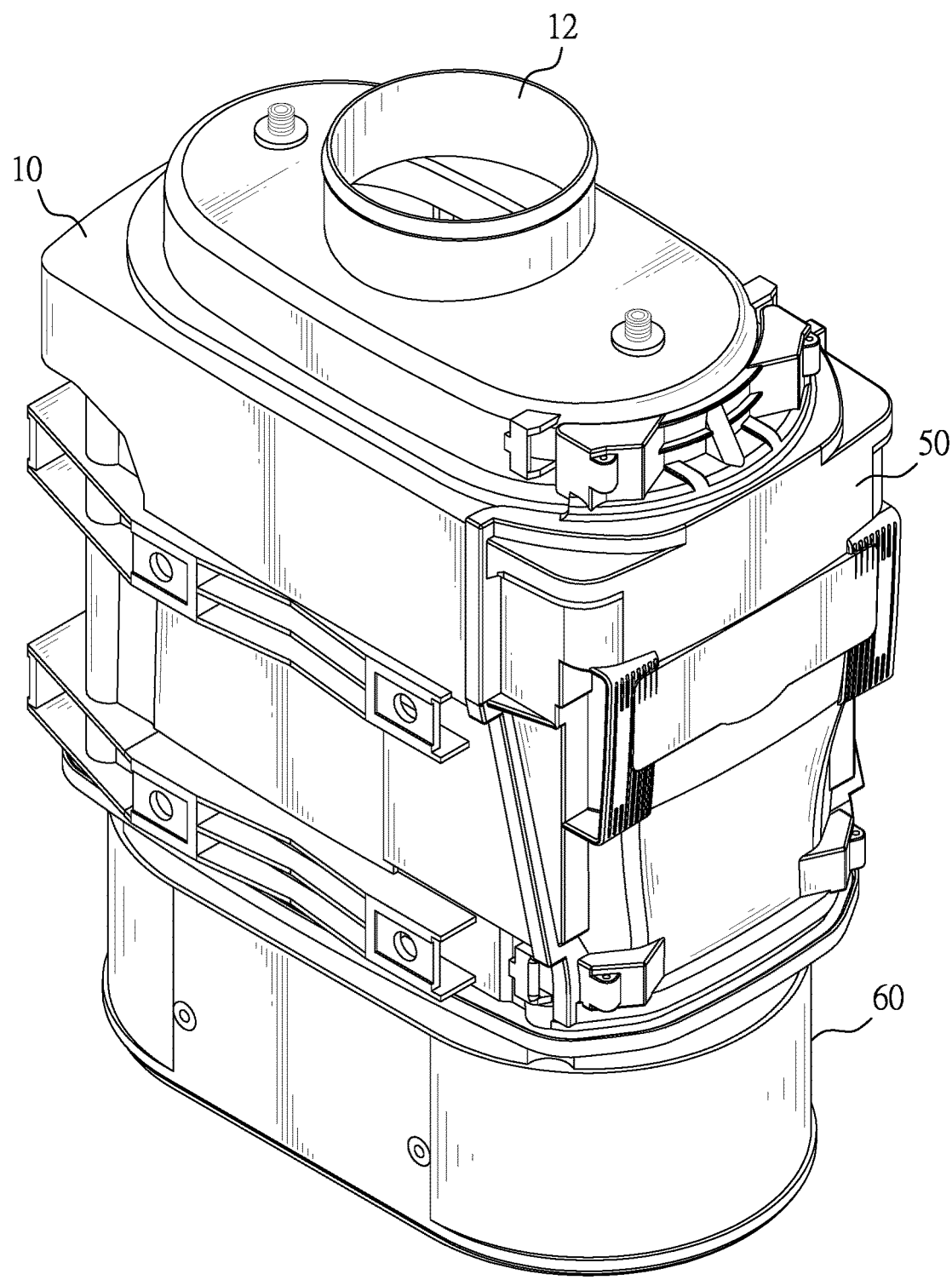
FIG. 1 is a perspective view of a side-covered axial flow filter in accordance with the present invention.
Figure 2:
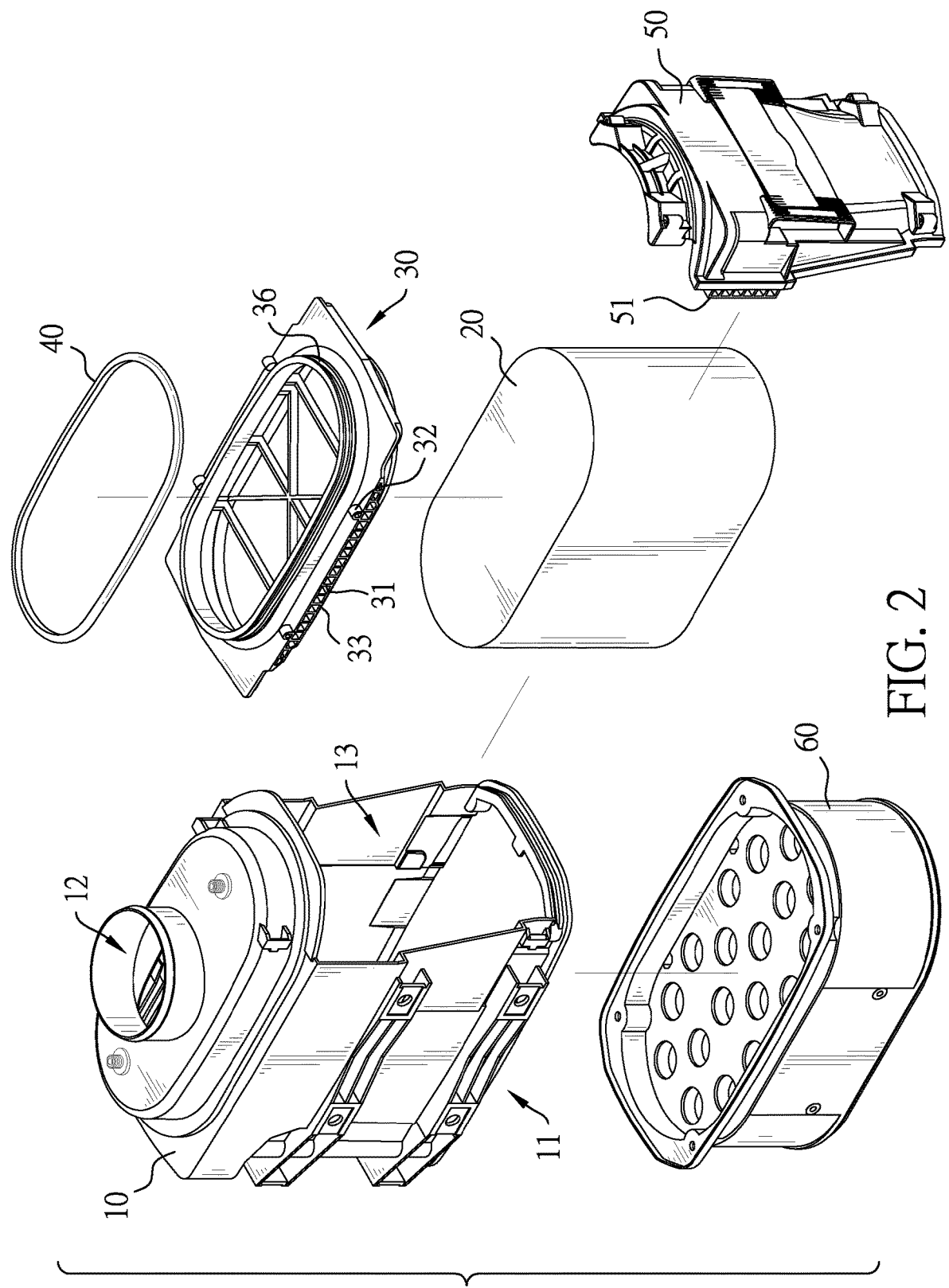
FIG. 2 is an exploded perspective view of the axial flow filter and the side cover in FIG. 1.

With reference to FIGS. 1 and 2, a side-covered axial flow filter in accordance with the present invention comprises a housing 10, a filter core 20, a filter frame 30, a sealing unit 40 and a side cover 50.

Figure 3:
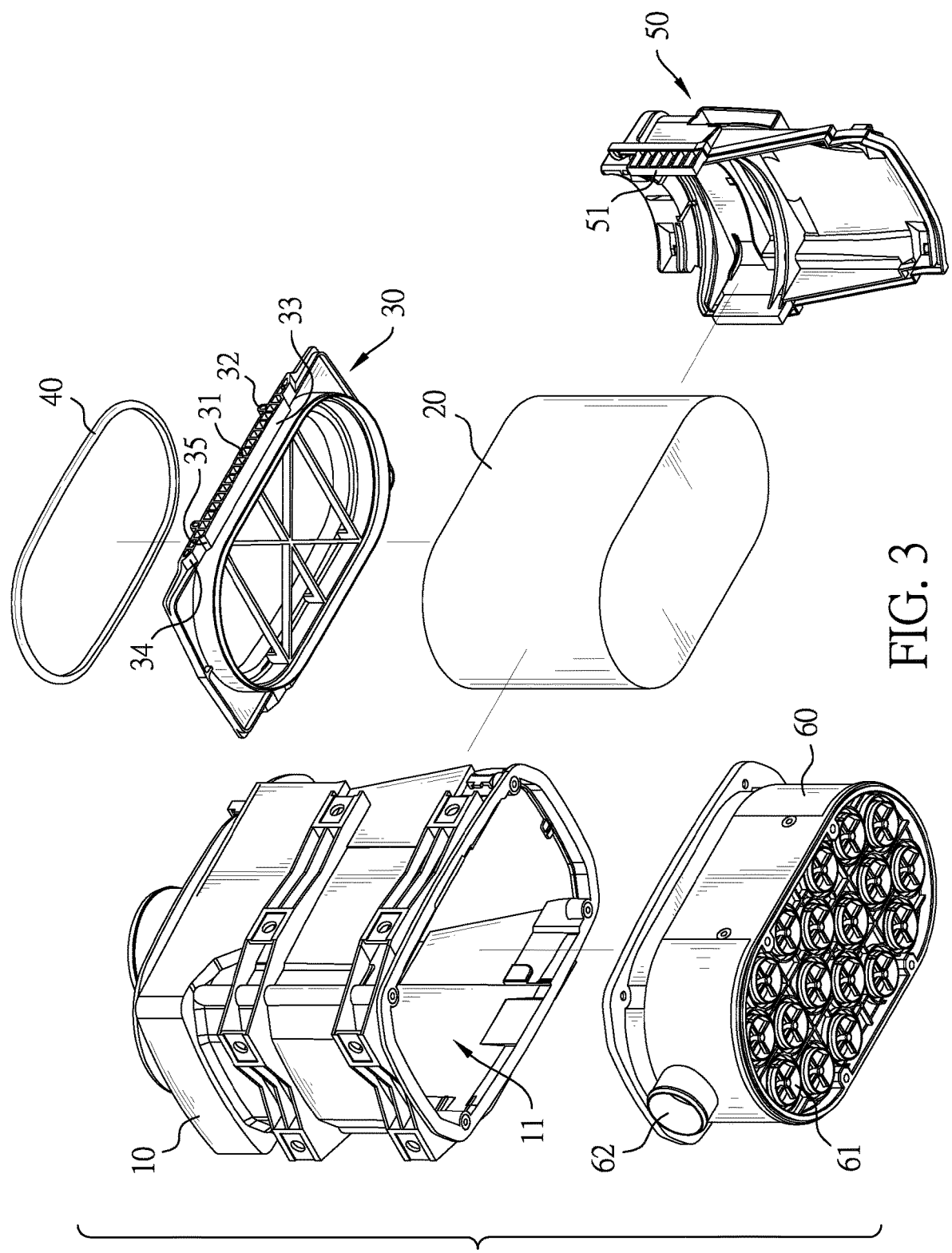
FIG. 3 is another exploded perspective view of the axial flow filter and the side cover in FIG. 1.
Figure 4:
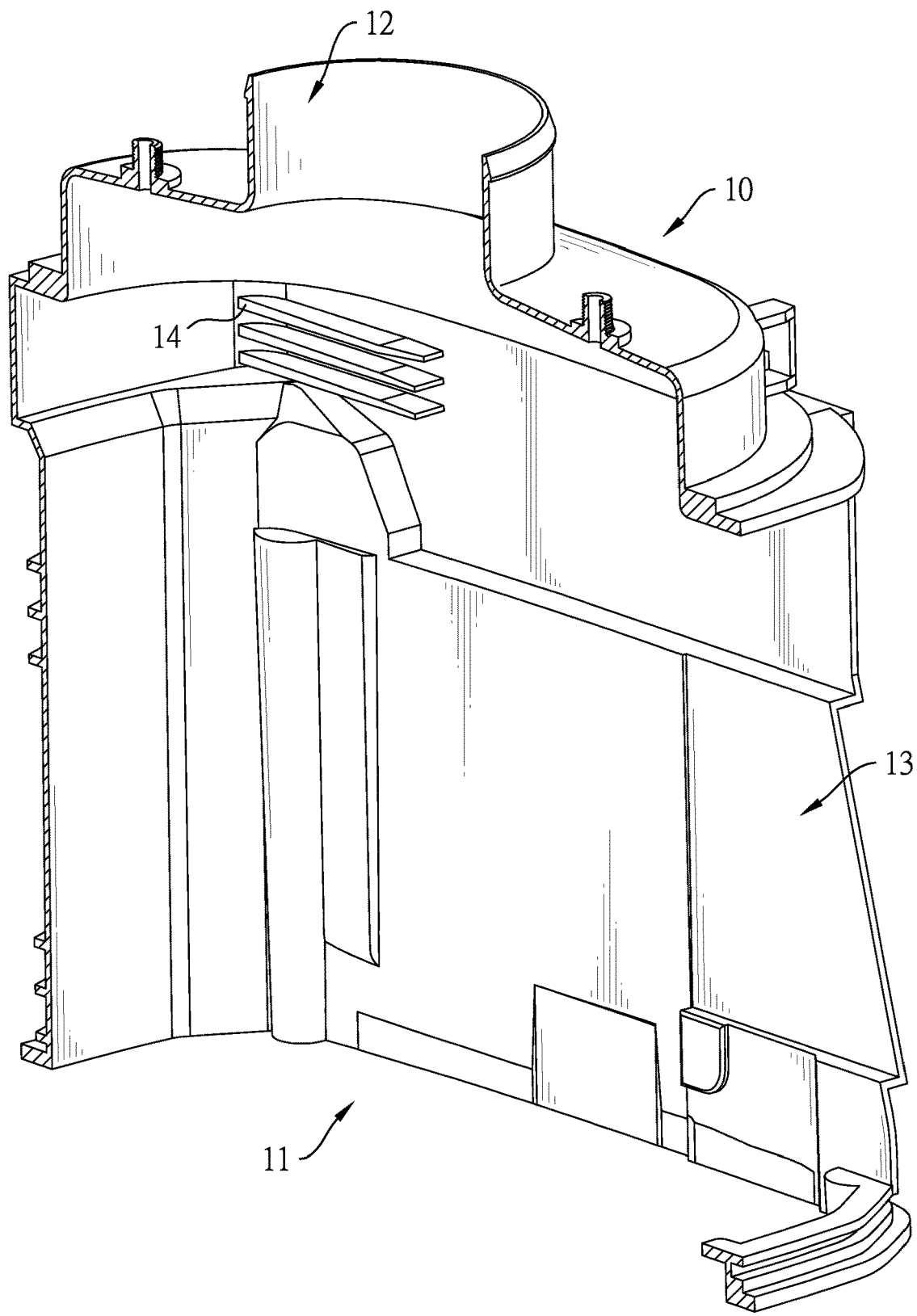
FIG. 4 is a perspective and cross sectional view of the housing in FIG. 1.

With reference to FIGS. 3 and 4, the housing 10 has an axial direction and a radial direction perpendicular to each other. The housing 10 further comprises an inner space, an inlet 11, an outlet 12, an installation opening 13, two first pushing panels 14 and a clamping surface 15. The inlet 11 is formed on an end of the housing 10 along the axial direction. The outlet 12 is formed on another end of the housing 10 along the axial direction, wherein said another end is opposite to the end on which the inlet 11 is formed; more specifically, the end with the inlet 11 and the end with the outlet 12 are two opposite ends of the housing 10 along the axial direction. The installation opening 13 is formed on a side surface of the housing 10 along the radial direction. The inlet 11, the outlet 12 and the installation opening 13 mutually communicate with each other via the inner space. The two first pushing panels 14 protrude from an inner surface of the housing 10 and are opposite to each other. The two first pushing panels 14 are also disposed adjacent to the outlet 12. The two first pushing panels 14 and the installation opening 13 are respectively disposed on two opposite sides of the housing 10 along the radial direction. The clamping surface 15 is defined as the inner surface of the housing, and the outlet 12 is formed through the clamping surface 15.

With reference to FIGS. 1 to 4, specifically, according to the disposition shown in the figures, the installation opening 13 is formed on a transverse side surface of the housing 10, and the two first pushing panels 14 respectively protrude from a front inner surface of the housing 10 and a rear inner surface of the housing 10, but the disposition is not limited thereto.

With reference to FIGS. 2 and 3, the filter core 20 is disposed in the housing 10. The configuration and the shape of the filter core 20 are not limited thereto, as long as fluids may pass through the filter core 20 to be filtered by the filter core 20. For example, the shape of the filter core 20 may be circular, obround, etc. In a preferred embodiment, the filter core 20 is in the shape of, but not limited to, a honey comb structure that has several axial tunnels. The filter core 20 may also be folded in shape. Because the shape and configuration of the filter core 20 have many possibilities, the figures shown are only schematic presentations.

Figure 5:
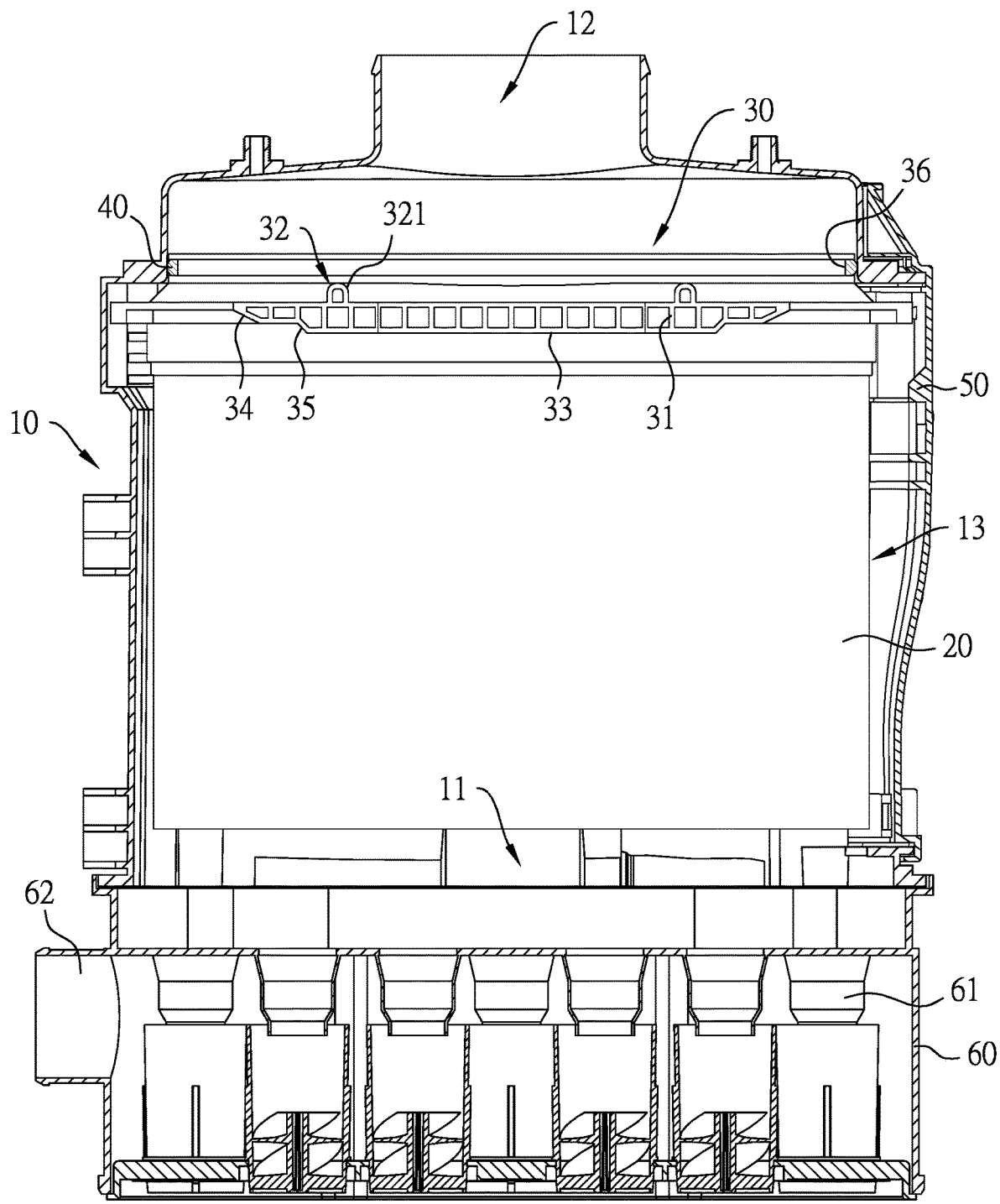
FIG. 5 is a cross sectional front view of the present invention.

With reference to FIGS. 2, 3, and 5, the filter frame 30 is mounted around an end of the filter core 20 along the axial direction of the housing 10. The filter frame 30 is adjacent to the outlet 12 of the housing 10. In a preferred embodiment, the filter core 20 only needs one filter frame 30, which is to be mounted around the end of the filter core 20 that is adjacent to the outlet 12. As for the other end of the filter core 20 that is adjacent to the inlet 11, there is no requirement for a filter frame to be mounted around. Furthermore, the end of the filter core 20 which is adjacent to the inlet 11 is arranged apart from the housing 10 and thus is not pushed.

Figure 9:
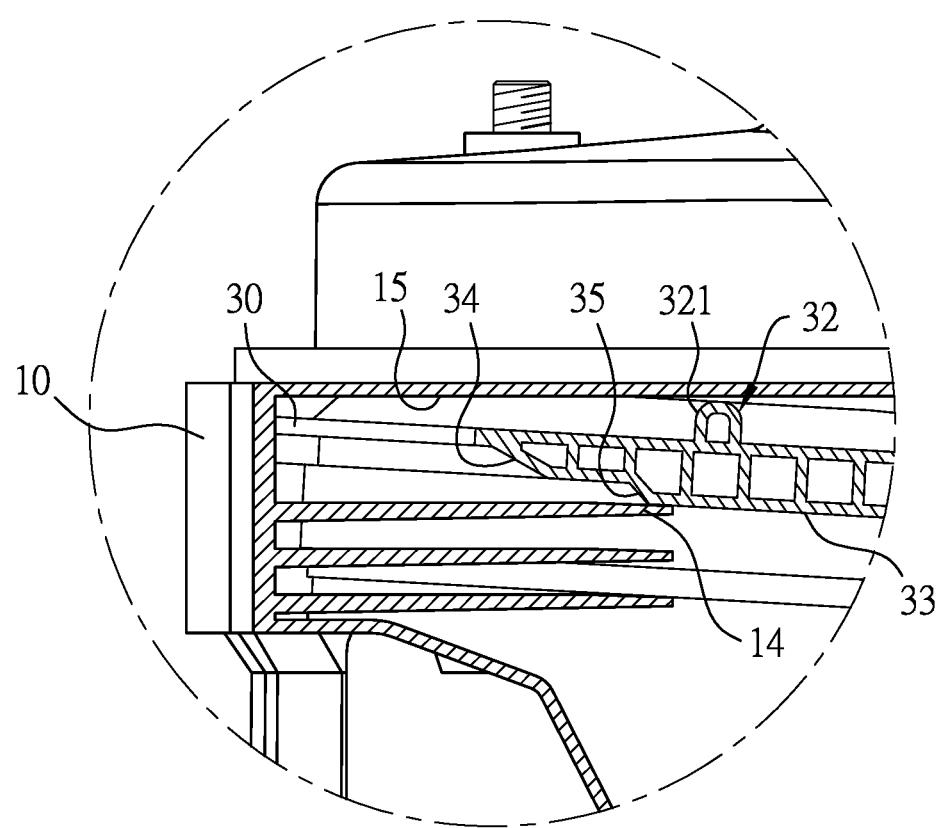
FIG. 9 is a partially enlarged cross sectional view of FIG. 6.
Figure 10:
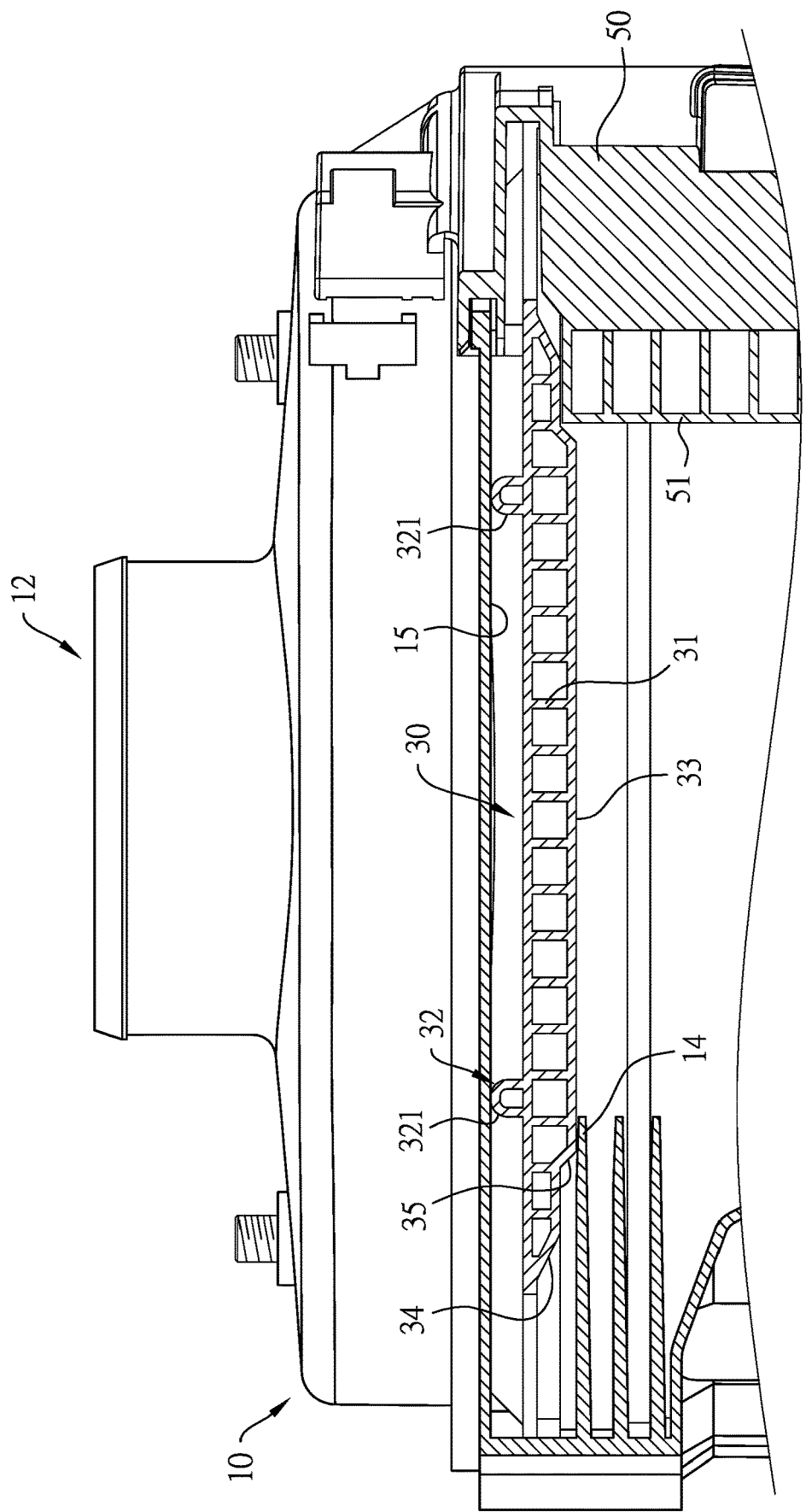
FIG. 10 is a partially enlarged cross sectional view of FIG. 8.

With reference to FIGS. 4, 9, and 10, two limiting ribs 31 protrude from the filter frame 30 and are opposite to each other. Each one of the two limiting ribs 31 protrudes through a portion between the corresponding first pushing panel 14 and the clamping surface 15 of the housing 10. Each one of the two limiting ribs 31 has an outer pushing part 32, an inner pushing part 33, two first guiding inclined surfaces 34, and two second guiding inclined surfaces 35.

The outer pushing part 32 protrudes toward the outlet 12 of the housing 10 and abuts against the clamping surface 15 of the housing 10. In a preferred embodiment, the outer pushing part 32 comprises two protrusions 321, the two protrusions 321 are formed on two opposite sides of the limiting rib 31 so the two protrusions 321 may evenly push the clamping surface 15 of the housing 10. However, the shape of the outer pushing part 32 is not limited thereto, as the outer pushing part 32 may also be an elongated protrusion or several smaller blocks.

The inner pushing part 33 protrudes toward the inlet 11 of the housing 10 and abuts against the first pushing panel 14. Specifically, the portion of the inner pushing part 33 abutting against the first pushing panel 14 is radially outward with respect to the portion of the outer pushing part 32 abutting against the clamping surface 15 of the housing 10 (as shown in FIG. 10). In other words, the portion of the outer pushing part 32 abutting against the clamping surface 15 of the housing 10 is nearer to the axial center of the outlet 12 than the portion of the inner pushing part 33 abutting against the first pushing panel 14. In a preferred embodiment, the inner pushing part 33 is an elongated protrusion, but it is not limited thereto, as the inner pushing part 33 may also be in any other shape.

The two first guiding inclined surfaces 34 are formed on two opposite sides of the limiting rib 31 along the radial direction respectively. The first guiding inclined surface 34 which is farther from the installation opening 13 is disposed between the first pushing panel 14 and the clamping surface 15 of the housing 10.

The two second guiding inclined surfaces 35 are formed on two opposite sides of the inner pushing part 33 along the radial direction respectively. The second guiding inclined surface 35 that is farther from the installation opening 13 is disposed between the first pushing panel 14 and the clamping surface 15 of the housing 10.

The two first guiding inclined surfaces 34 and the two second guiding inclined surfaces 35 for each one of the limiting ribs 31 make the limiting rib easier to pass through the portion between the corresponding first pushing panel 14 and the clamping surface 15 of the housing 10. Therefore the guiding inclined surfaces 34, 35 enhance the efficiency of the assembling and the disassembling process.

With reference to FIGS. 2, 3, and 5, the sealing unit 40 is mounted around the filter frame 30. Furthermore, the sealing unit 40 is clamped between the filter frame 30 and the housing 10. In a preferred embodiment, the filter frame 30 has an annular recess 36 concaved annularly and radially on the filter frame 30. The sealing unit 40 is mounted in the annular recess 36 and radially clamped between the filter frame 30 and the inner surface of the housing 10, but it is not limited thereto. The sealing unit 40 may also be clamped axially between the filter frame 30 and the inner surface of the housing 10.

Clamping the sealing unit 40 radially has several advantages. First, the pushing force required to push the sealing unit 40 tightly is smaller than that to clamp the sealing unit 40 axially. Second, the smaller the required force, the more easily the user can straighten the filter frame 30 and the filter core 20, which makes the assembling process more convenient. Third, the contact area between the radially clamped sealing unit 40 and the inner surface of the housing 10 is smaller than the axially clamped sealing unit 40 and the inner surface of the housing 10 during the assembling process, which reduces the friction between the sealing unit 40 and the inner surface of the housing 10.

Figure 8:
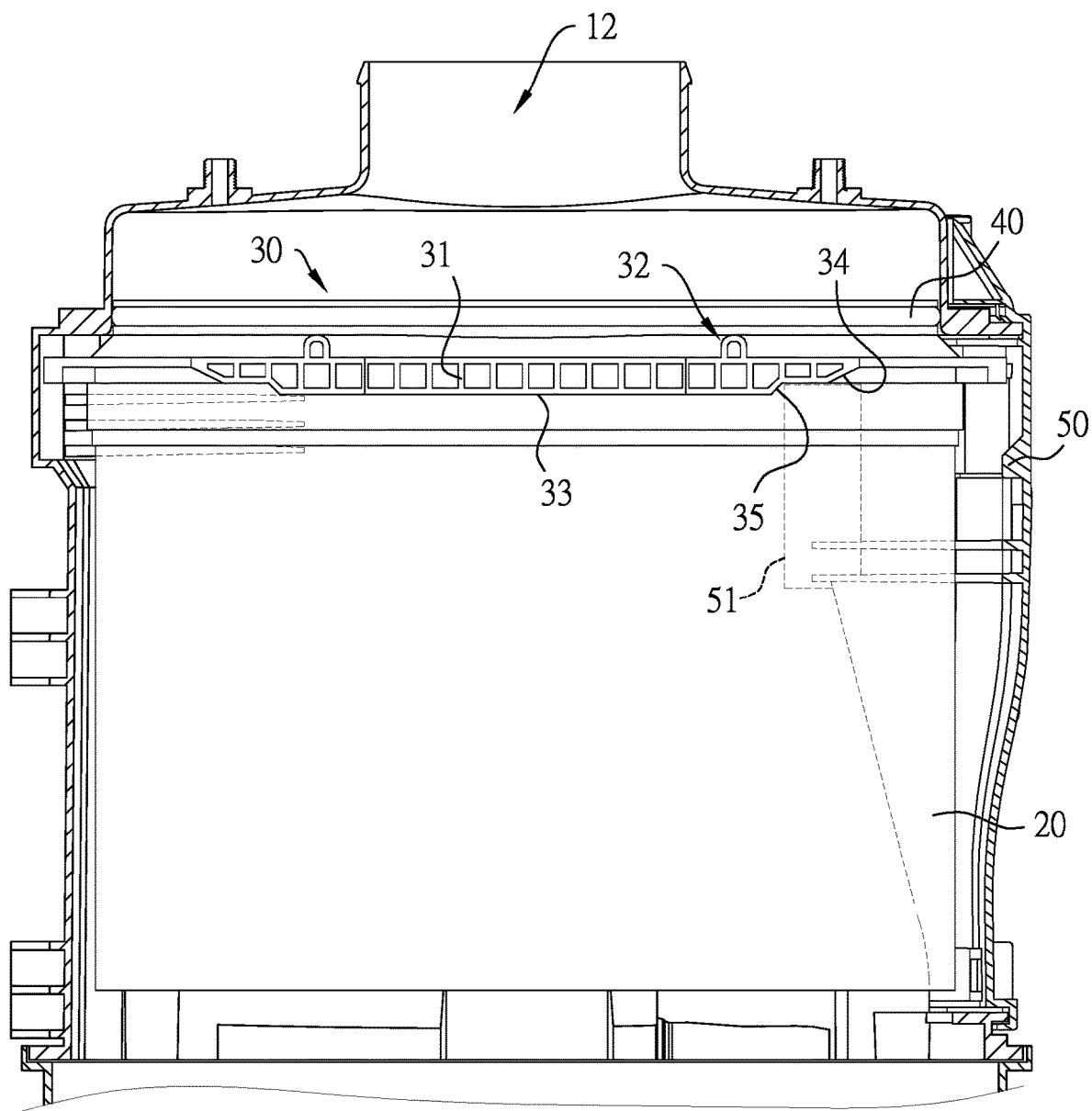

With reference to FIGS. 2 and 3, the side cover 50 is detachably mounted on the housing 10 and covers the installation opening 13. The side cover 50 pushes the filter frame 30 toward the outlet 12 of the housing 10. With reference to FIGS. 8 and 10, in a preferred embodiment, two second pushing panels 51 protrude from an inner surface of the side cover 50 and toward the housing 10. The two second pushing panels 51 push the two limiting ribs 31 of the filter frame 30 respectively toward the outlet 12 of the housing 10. Therefore the two second pushing panels 51 jointly push the filter frame 30 toward the outlet 12 of the housing 10. Alternatively, the second pushing panels 51 may abut portions other than the limiting ribs 31. In other embodiments, there may be no second pushing panels 51 on the side cover 50; in those embodiments, the filter frame 30 protrudes and is mounted through the side cover 50, and therefore the side cover 50 may still be capable of pushing the filter frame 30 toward the outlet 12 of the housing 10.

In a preferred embodiment, the two second pushing panels 51 radially abut against the two inner pushing parts 33 of the filter frame 30 respectively. By the means aforementioned, the side cover 50 may radially limit the position of the filter frame 30, thereby preventing the filter frame 30 from shaking relative to the housing 10.

With reference to FIG. 10, moreover, the two protrusions 321 of the outer pushing part 32 are radially adjacent to the corresponding first pushing panel 14 of the housing 10 and the corresponding second pushing panel 51 of the side cover 50 respectively. Therefore the pushing force from the first pushing panel 14 and the second pushing panel 51 toward the limiting ribs 31 may be easily transmitted to the nearby protrusions 321.

Within the two aforementioned first guiding inclined surfaces 34, the first guiding inclined surface 34 that is near the installation opening 13 is disposed between the corresponding second pushing panel 51 and the inner surface of the housing 10. Therefore when covering the side cover 50, the second pushing panels 51 may push the limiting ribs 31 and the whole filter frame 30 along the first guiding inclined surface 34, which may enhance the assembling efficiency.

With reference to FIGS. 2, 3, and 5, the present embodiment further comprises a multi-tube prefilter 60 detachably mounted on the inlet 11 of the housing 10. The multi-tube prefilter 60 comprises multiple cyclone separators 61 and a lateral air tube 62. The cyclone separators 61 are capable of allowing the air and fluids to pass therethrough along the axial direction and move into the multi-tube prefilter 60, in which the air and fluids will then be prefiltered. The lateral air tube 62 is formed on a side surface of the multi-tube prefilter 60. The lateral air tube 62 may be used to connect to a dust collecting cup or an air-withdrawing tube so as to enhance the efficiency of the multi-tube prefilter 60.

Figure 11:
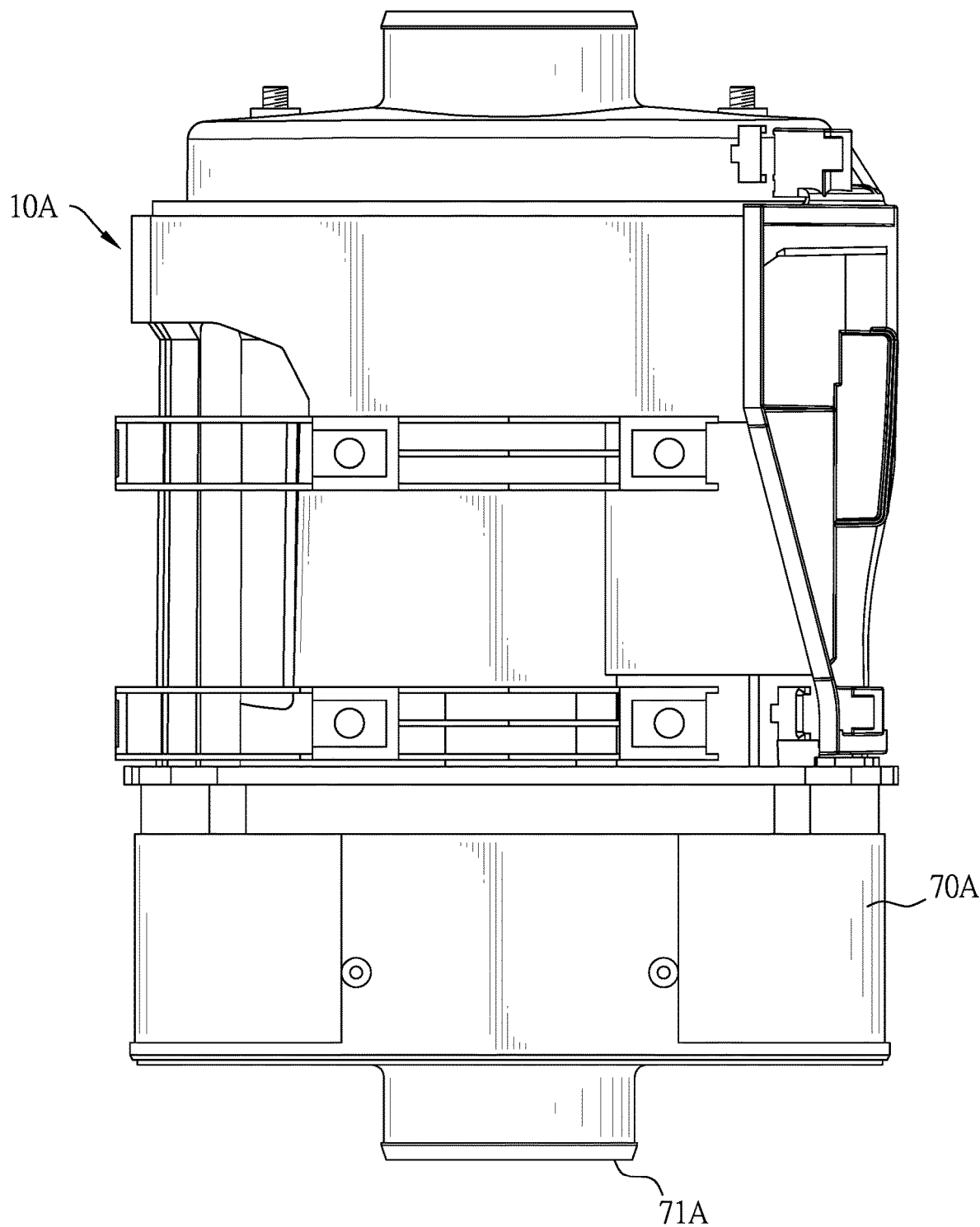
FIG. 11 is a side view of another embodiment of the side-covered axial flow filter in accordance with the present invention.

With reference to FIG. 11, in another embodiment, an inlet cover 70A is mounted on the inlet of the housing 10A. The inlet cover 70A is used to replace the multi-tube prefilter to guide the air into the housing 10A. The inlet cover 70A is detachably mounted on the inlet of the housing 10A. An air tube connector 71A protrudes from the inlet cover 70A, and the air tube connector 71A may be mounted with an extension air tube to prevent water permeating into the air tube connector 71A. The number of the air tube connector 71A is not limited to one.

In still another embodiment, a protective grille is mounted on the inlet 11 of the housing to replace the multi-tube prefilter 60 or the inlet cover 70A. The protective grille may prevent some foreign matters of a certain volume from being sucked into the housing. Moreover, materials such as cloth filter that is provided with larger filtering pores may be disposed in the protective grille to further prevent the foreign matters from being sucked in as long as the said filtering pores do not affect the air flow.

The assembling process of the present invention includes three steps.

Figure 6:
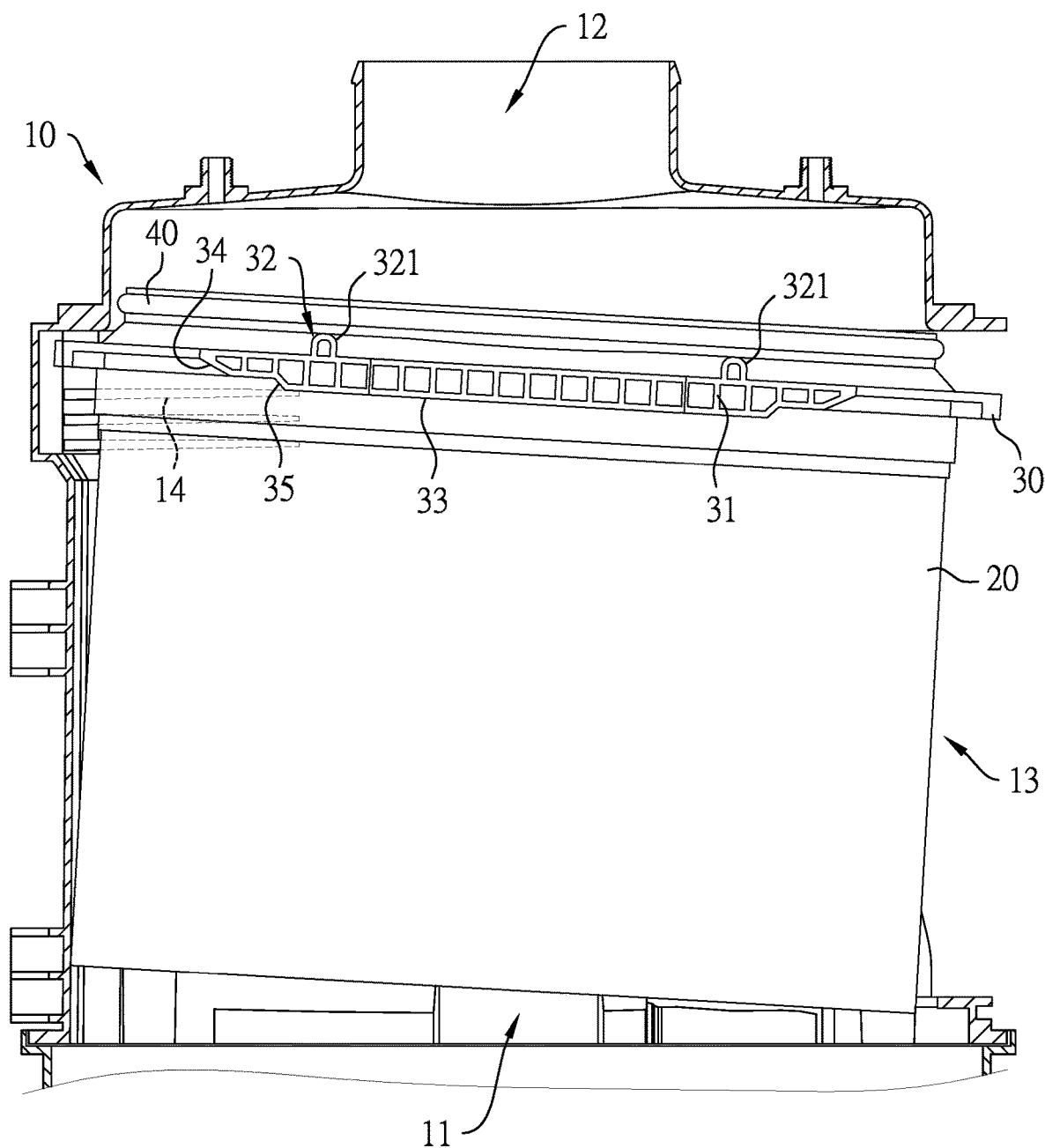
FIG. 6 to FIG. 8 are operational views of the assembly process of the side-covered axial flow filter in accordance with the present invention.

With reference to FIGS. 6 and 9, first, mount the filter frame 30 on the filter core 20, and dispose the filter core 20 and the filter frame 30 obliquely into the housing 10 through the installation opening 13 together. Obliquely mount the limiting ribs 31 of the filter frame 30 through the portion between the corresponding first pushing panel 14 of the housing 10 and the clamping surface 15 of the housing 10. Abut the inner pushing parts 33 of the limiting ribs 31 against the corresponding first pushing panels 14. During the aforementioned processes, the first guiding inclined surfaces 34 and the second guiding inclined surfaces 35 may guide the limiting ribs 31 to move and mount through the portions between the first pushing panels 14 and the clamping surface 15 of the housing 10.

Figure 7:
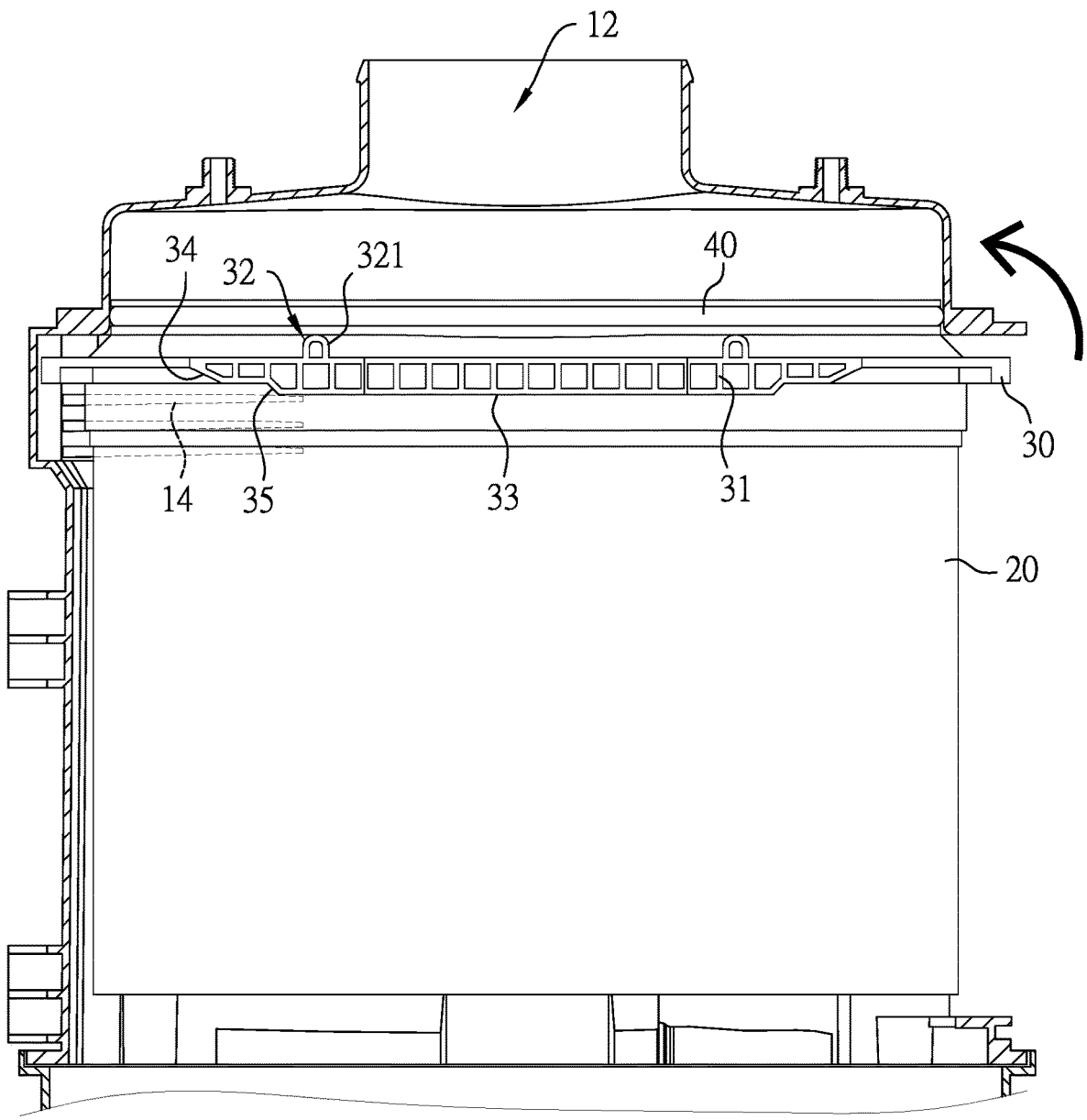

With reference to FIGS. 7 and 10, then take the portions of the inner pushing parts 33 abutting the first pushing panels 14 as the fulcrums, and straighten the position of the filter core 20 and the filter frame 30 toward the outlet 12 of the housing 10. Therefore the outer pushing parts 32 of the limiting ribs which are on the opposite sides of the installation opening 13 may abut against the clamping surface 15 of the housing 10. Because the pushing force toward the inner side and the outer side of the limiting ribs 31 are in a stagger manner along the radial direction, this disposition generates a stable and strong torque (similar to the seesaw principle), and thereby the filter frame 30 is capable of abutting the outlet 12 of the housing 10 tightly. Meanwhile, for the users, the force they exert need not be too great, and therefore the present invention is labor-saving and tightly sealed.

With reference to FIGS. 8 and 10, lastly, cover the side cover 50 on the housing 10, and the two second pushing panels 51 may push the limiting ribs 31 and the whole filter frame 30 toward the outlet 12 of the housing 10 along the first guiding inclined surfaces 34.

Besides, the present invention may also achieve the aforementioned labor-saving and tightly sealed effects by taking the portions of where the inner pushing parts 33 abutting the first pushing panels 14 as fulcrums to push the filter core 20 and the filter frame 30.

Moreover, the radial sealing in the present invention may greatly reduce the pushing force needed for the pushing the sealing unit 40, and also reduce the friction between the sealing unit 40 and the housing 10.

Furthermore, the two opposite sides of the filter frame 30 is pushed respectively by the corresponding first pushing panel 14 of the housing 10 and the second pushing panel 51 of the side cover 50, and therefore the filter frame 30 is pushed in balance, which ensures the sealing pressure remains the same and balanced. By the aforementioned means, the present invention prevents the filter frame 30, the housing 10 or the side cover 50 from being damaged by the excessive forces caused by the unbalanced sealing pressures.

In addition, the present invention only needs one single filter frame 30 with a simple structure, thereby reducing the cost of manufacture. The single-filter-frame structure may also allows a housing 10 to be suitable for filter cores 20 in different sizes.

Lastly, the filter frame 30 is directly pushed by the housing 10 and the side cover 50, and the filter frame 30 also directly abuts the sealing unit 40. Therefore the extension line of the pushing force to compress the sealing unit 40 will not pass through the filter core 20, and therefore the filter core 20 may avoid deformation or damage.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A side-covered axial flow filter comprising:
    a housing having
        an axial direction;
        a radial direction being perpendicular to the axial direction;
        an inlet;
        an outlet; the inlet and the outlet respectively formed on two opposite ends of the housing along the axial direction;
        an installation opening formed in a side surface of the housing along the radial direction and communicating with the inlet and the outlet;
        a clamping surface defined as an inner surface of the housing, and the outlet formed through the clamping surface;
        two first pushing panels protruding from the inner surface of the housing, opposite to each other, and being adjacent to the outlet; the two first pushing panels and the installation opening respectively disposed on two opposite sides of the housing along the radial direction;
    a filter core mounted in the housing;
    a filter frame mounted on an end of the filter core along the axial direction, mounted in the housing, being adjacent to the outlet of the housing, and having
        two limiting ribs protruding from the filter frame, opposite to each other; each one of the two limiting ribs protruding through a portion of the housing between a respective one of the two first pushing panels and the clamping surface, and having
            an outer pushing part protruding toward the outlet of the housing and abutting said clamping surface;
            an inner pushing part protruding toward the inlet of the housing and abutting said respective first pushing panel; wherein a portion of the inner pushing part abutting said respective first pushing panel is positioned radially outward with respect to a portion of the outer pushing part abutting the clamping surface of the housing;
    a sealing unit mounted on the filter frame and clamped between the filter frame and the housing; and
    a side cover detachably mounted on the housing, covering the installation opening, and pushing the filter frame toward the outlet of the housing;
    wherein when the side cover is mounted on the housing, covering the installation opening, the side cover pushes the filter frame toward the outlet of the housing, such that the first pushing panels of the housing respectively push the inner pushing parts of the filter frame toward the outlet, and the outer pushing parts of the filter frame push towards the outlet and against the clamping surface of the housing.

2. The side-covered axial flow filter as claimed in claim 1, wherein the side cover has
two second pushing panels protruding from an inner surface of the side cover and toward the housing, and pushing the two limiting ribs of the filter frame toward the outlet of the housing respectively.

3. The side-covered axial flow filter as claimed in claim 2, wherein each one of the outer pushing parts of the filter frame has
two protrusions, each one of the two protrusions adjacent to the corresponding first pushing panel of the housing and the corresponding second pushing panel of the side cover.

4. The side-covered axial flow filter as claimed in claim 2, wherein the two second pushing panels of the side cover radially abut the two inner pushing parts of the filter frame respectively.

5. The side-covered axial flow filter as claimed in claim 1, wherein each one of the two limiting ribs of the filter frame has
a first guiding inclined surface formed on a radial side of the limiting rib and disposed between the corresponding first pushing panel and the clamping surface of the housing.

6. The side-covered axial flow filter as claimed in claim 5, wherein each one of the two inner pushing parts of the filter frame has
a second guiding inclined surface formed on a radial side of the inner pushing part and disposed between the corresponding first pushing panel and the clamping surface of the housing.

7. The side-covered axial flow filter as claimed in claim 1, wherein the sealing unit is mounted around the filter frame and is radially clamped between the filter frame and the housing.

8. The side-covered axial flow filter as claimed in claim 1 further comprising a multi-tube prefilter detachably mounted on the inlet of the housing.

9. The side-covered axial flow filter as claimed in claim 8, wherein the multi-tube prefilter further comprises a lateral air tube mounted on a side surface of the multi-tube prefilter.

10. The side-covered axial flow filter as claimed in claim 1 further comprising:
an inlet cover detachably mounted on the inlet of the housing and having
an air tube connector protruding from the inlet cover.

* * * * *